Figure 1:
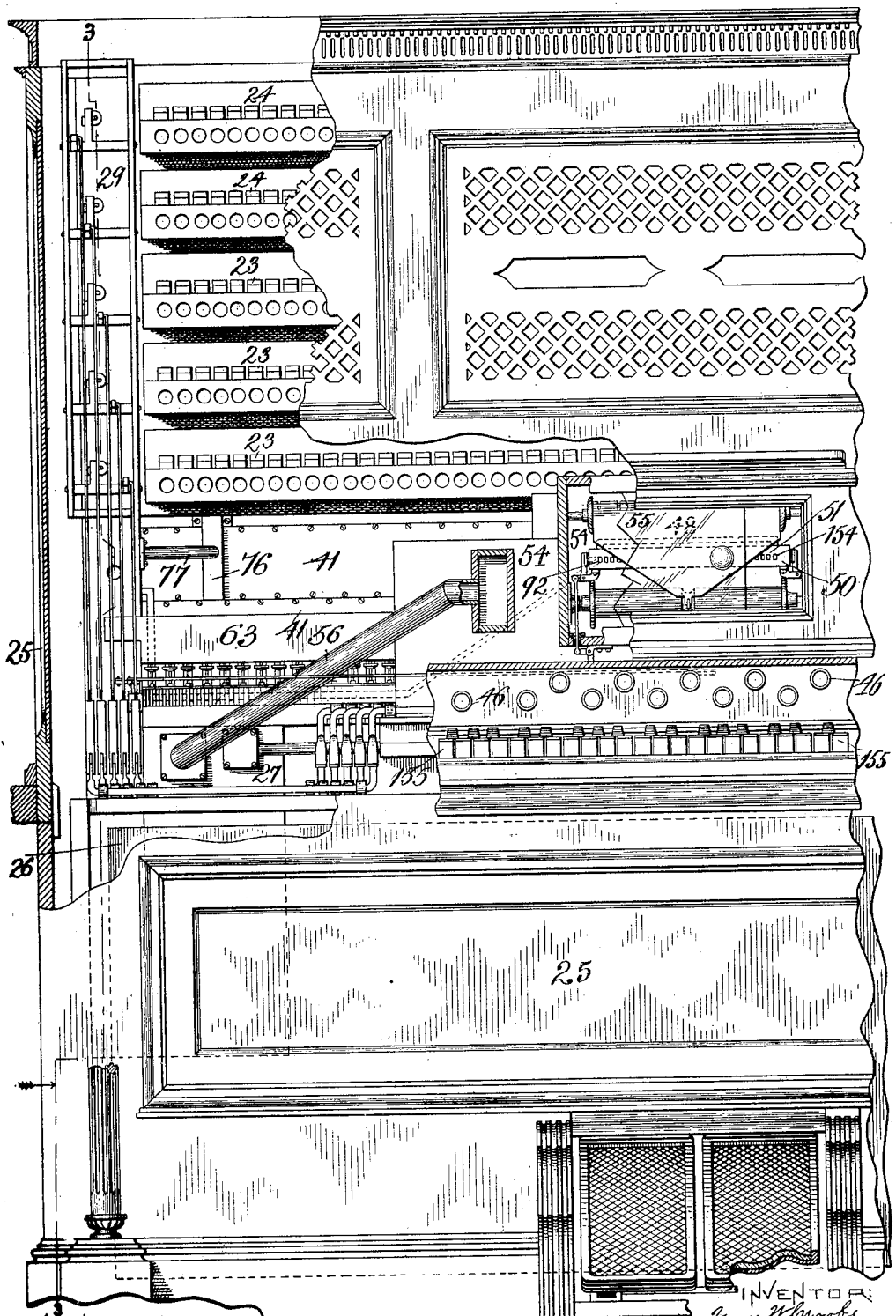

No. 671,691. Patented Apr. 9, 1901.
J. W. CROOKS.
AUTOMATICALLY OPERATED ORGAN.
(Application filed Jan. 28, 1901.)
(No Model.) 10 Sheets—Sheet 1.

No. 671,691.  
Patented Apr. 9, 1901.

J. W. CROOKS.
AUTOMATICALLY OPERATED ORGAN.
(Application filed Jan. 28, 1901.)

(No Model.)  
10 Sheets—Sheet 2.

WITNESSES:  
INVENTOR:

No. 671,691. Patented Apr. 9, 1901.
J. W. CROOKS.
AUTOMATICALLY OPERATED ORGAN.
(Application filed Jan. 28, 1901.)
(No Model.) 10 Sheets—Sheet 3.

No. 671,691. Patented Apr. 9, 1901.
J. W. CROOKS.
AUTOMATICALLY OPERATED ORGAN.
(Application filed Jan. 28, 1901.)

(No Model.) 10 Sheets—Sheet 5.

WITNESSES: INVENTOR

No. 671,691. Patented Apr. 9, 1901.
J. W. CROOKS.
AUTOMATICALLY OPERATED ORGAN.
(Application filed Jan. 28, 1901.)
(No Model.) 10 Sheets—Sheet 6.

WITNESSES:
L. S. Basford.
G. Westwood.

INVENTOR:
James W. Crooks
by F. C. Fishermacher
Atty

No. 671,691. Patented Apr. 9, 1901.
J. W. CROOKS.
AUTOMATICALLY OPERATED ORGAN.
(Application filed Jan. 28, 1901.)
(No Model.) 10 Sheets—Sheet 8.

WITNESSES:
Lillian J. Basford
Georgie Westwood

INVENTOR:
James W. Crooks
by J. E. Teschemacher
Atty

No. 671,691. Patented Apr. 9, 1901.
J. W. CROOKS.
AUTOMATICALLY OPERATED ORGAN.
(Application filed Jan. 28, 1901.)
(No Model.) 10 Sheets—Sheet 10.
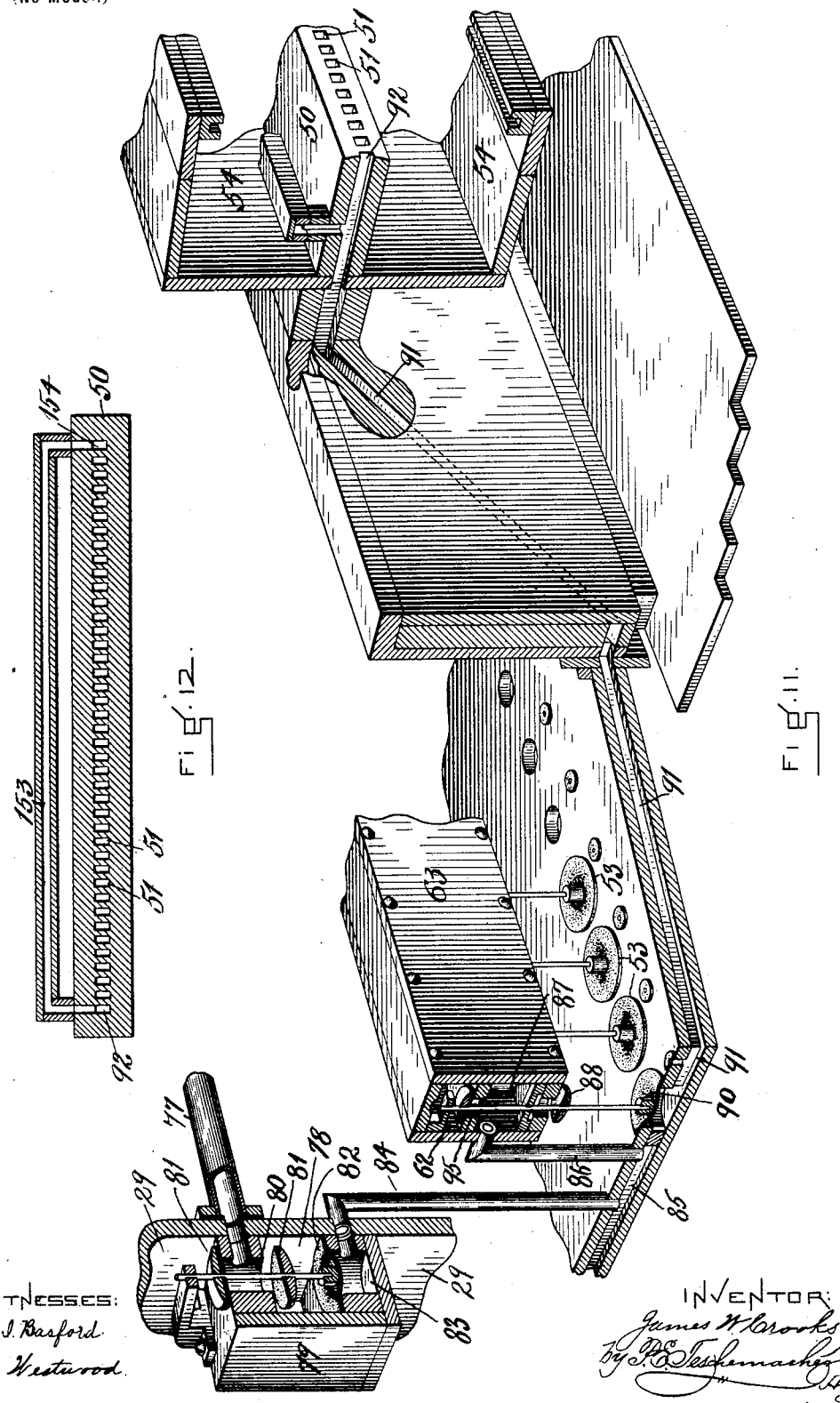
WITNESSES:
L. J. Basford.
G. Westwood.
INVENTOR:
James W. Crooks

UNITED STATES PATENT OFFICE.

JAMES W. CROOKS, OF BOSTON, MASSACHUSETTS, ASSIGNOR OF ONE-HALF TO WINCHESTER VEAZIE, OF SAME PLACE.

AUTOMATICALLY-OPERATED ORGAN.

SPECIFICATION forming part of Letters Patent No. 671,691, dated April 9, 1901.

Application filed January 28, 1901. Serial No. 45,124. (No model.)

*To all whom it may concern:*

Be it known that I, JAMES W. CROOKS, a citizen of the United States, residing at Boston, in the county of Suffolk and State of Massachusetts, have invented certain Improvements in Automatically-Operated Reed and Pipe Organs, of which the following is a specification.

My invention relates to reed and pipe organs which are adapted to be automatically operated by means of a perforated music-sheet.

The object of my invention is to enable any predetermined note or notes of any set or sets of reeds of a supplemental manual or group of sets of reeds or pipes the stop or stops of which have been previously drawn on to be sounded in connection with or without the corresponding note or notes of another manual or group of sets of reeds, whereby I am enabled to automatically produce solo effects not heretofore possible in instruments of this character, for the reason that in organs automatically operated by means of a perforated music-sheet as heretofore constructed when a stop or stops have been drawn the corresponding set or sets of reeds will necessarily be brought into action with every note played until the stop or stops of such additional set or sets of reeds are thrown off, while with my improvement the stops of the supplemental manual or group of sets of reeds or pipes may remain drawn on and the notes of said stops sounded only at certain times, as may be determined by supplemental perforations in the music-sheet and a corresponding supplemental duct in the tracker-board connected with pneumatic mechanism which controls the set or sets of reeds of the supplemental manual which it is desired to bring into action either alone or in combination with the corresponding notes of the first manual.

To this end my invention consists in certain pneumatic mechanism controlled by the perforated music-sheet, whereby the desired end is attained in a simple and effective manner, as will be hereinafter particularly set forth; and my invention also consists in certain novel combinations of parts and details of construction, as hereinafter fully described, and pointed out in the claims.

Figure 2:
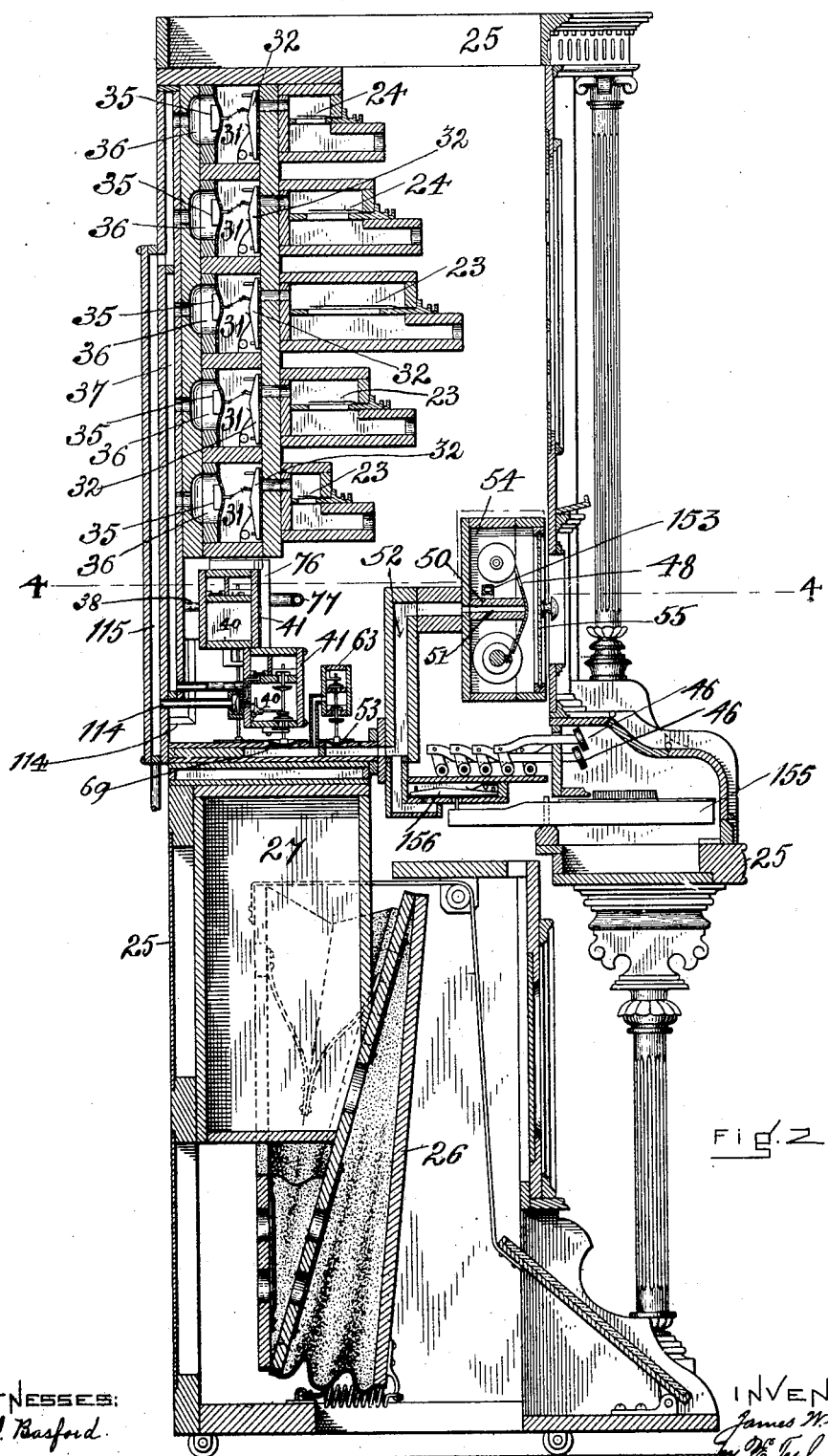
Figure 3:
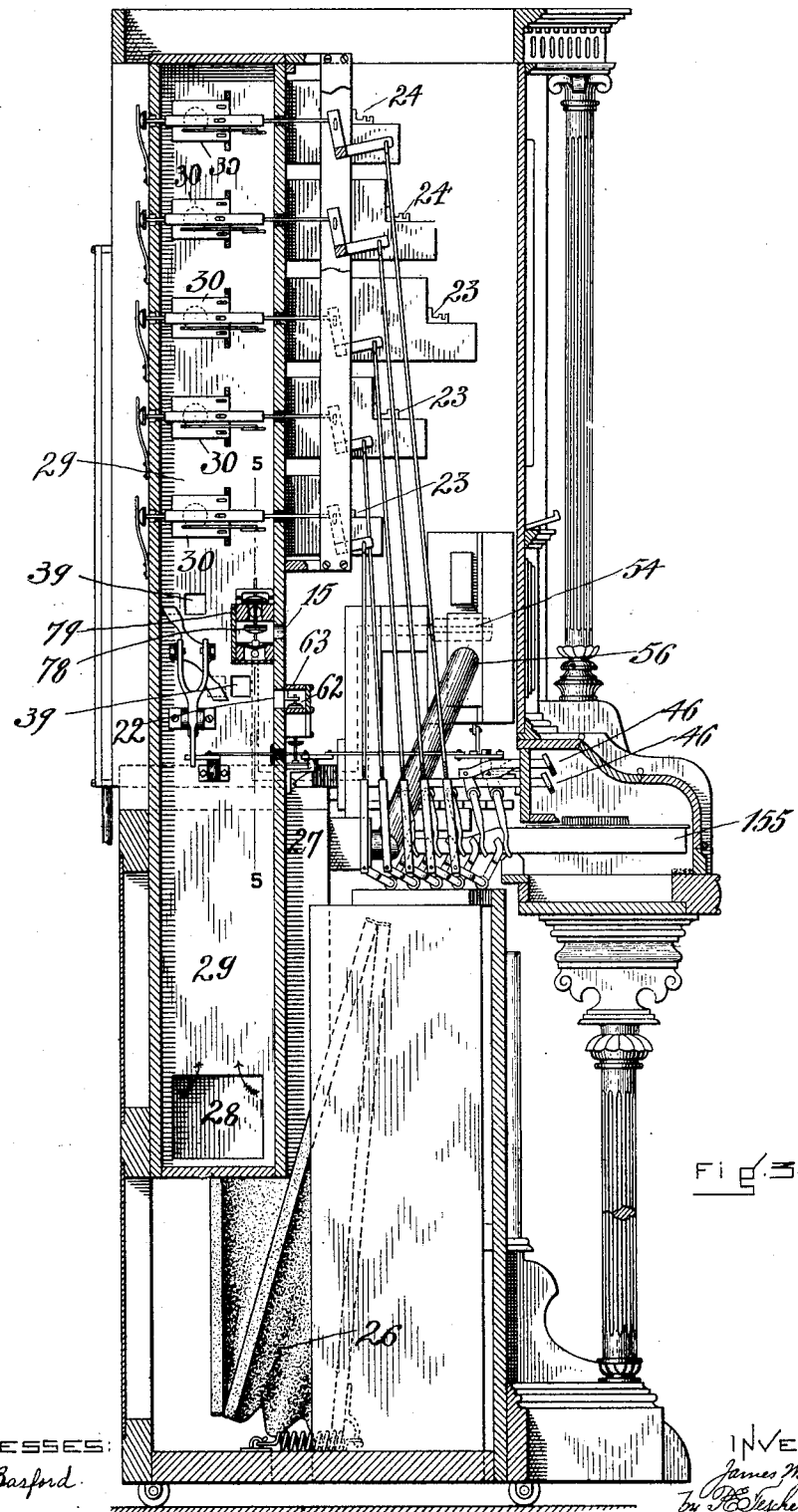
Figure 4:
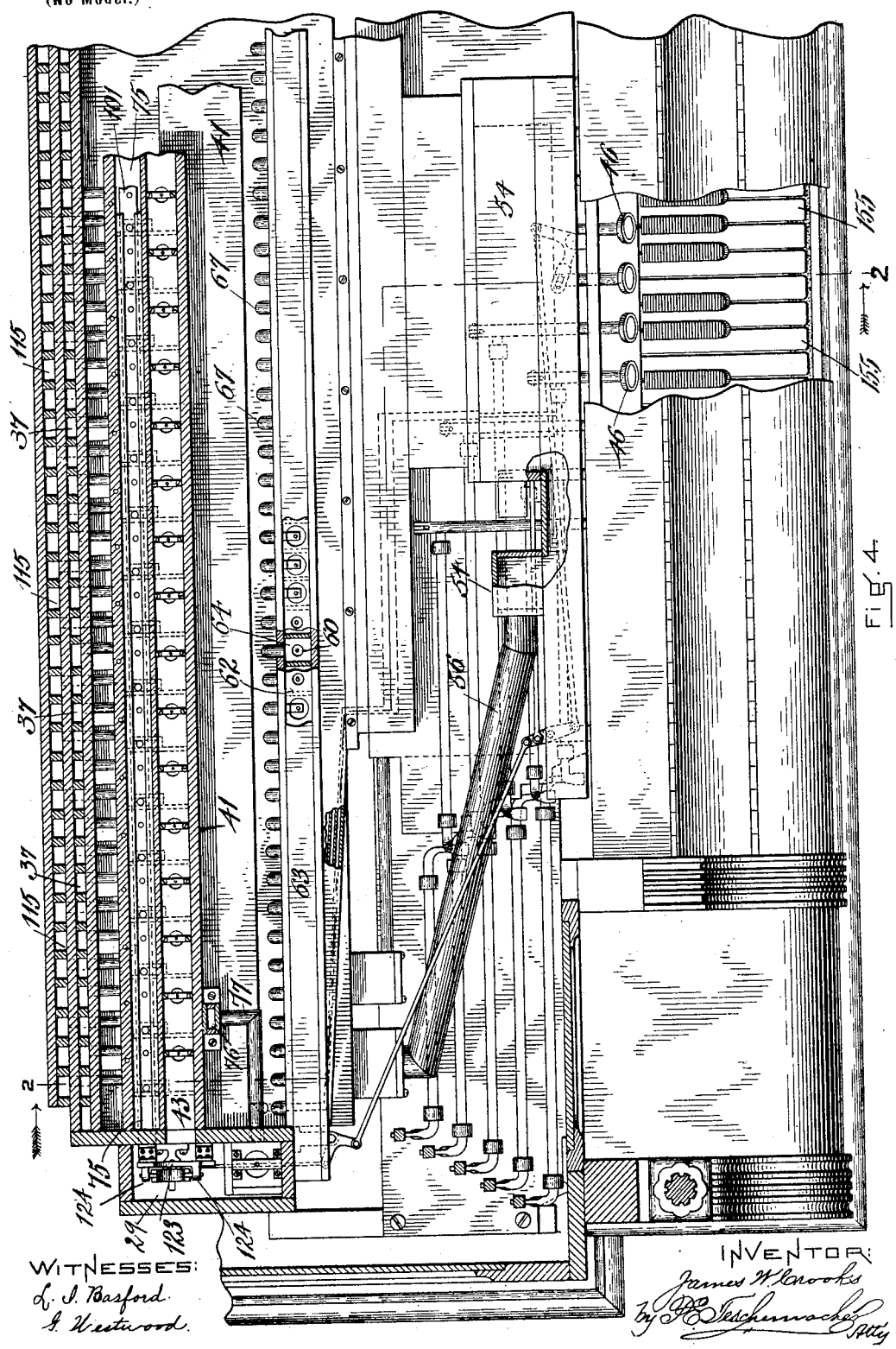
Figure 5:
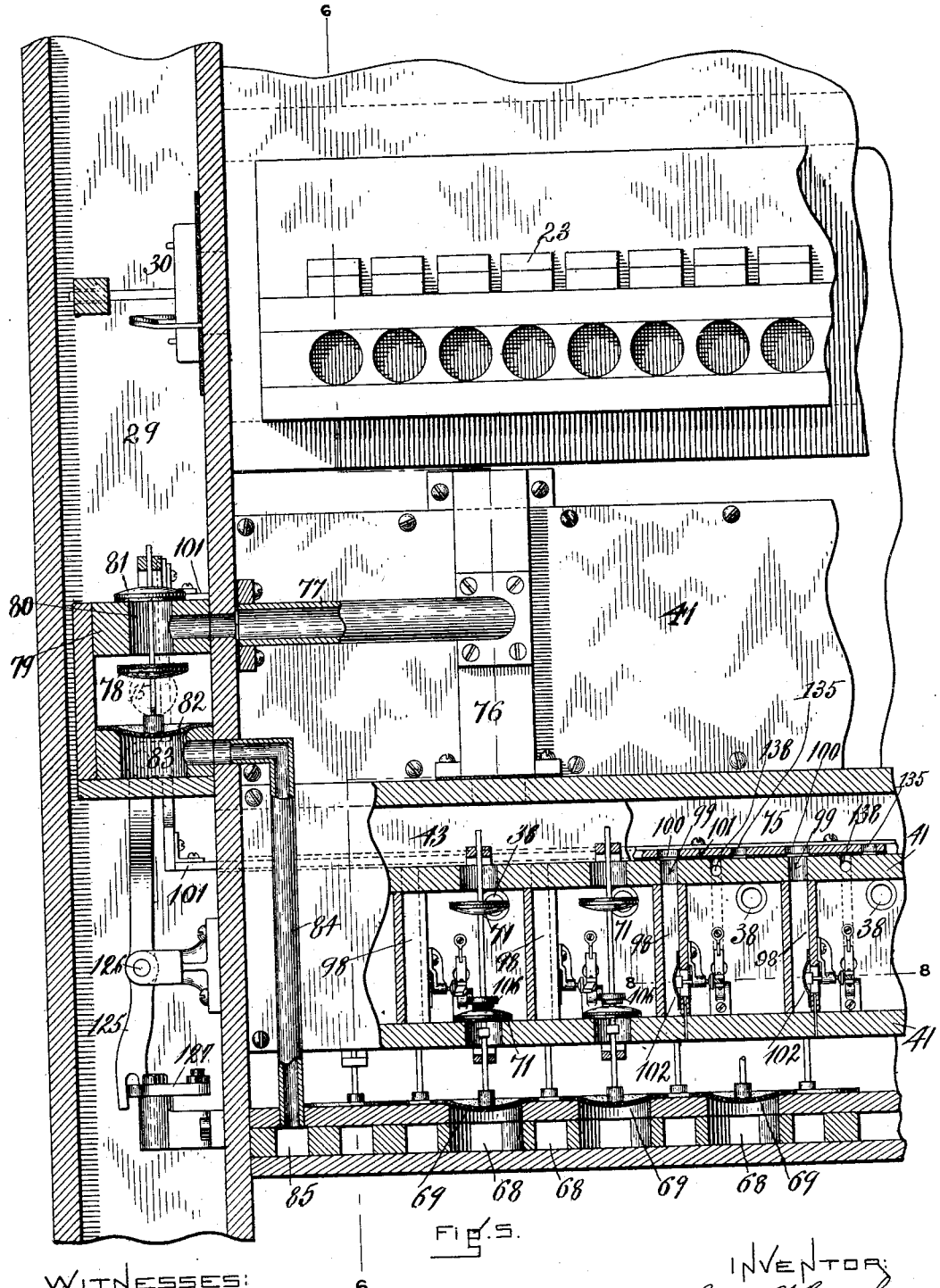
Figure 6:
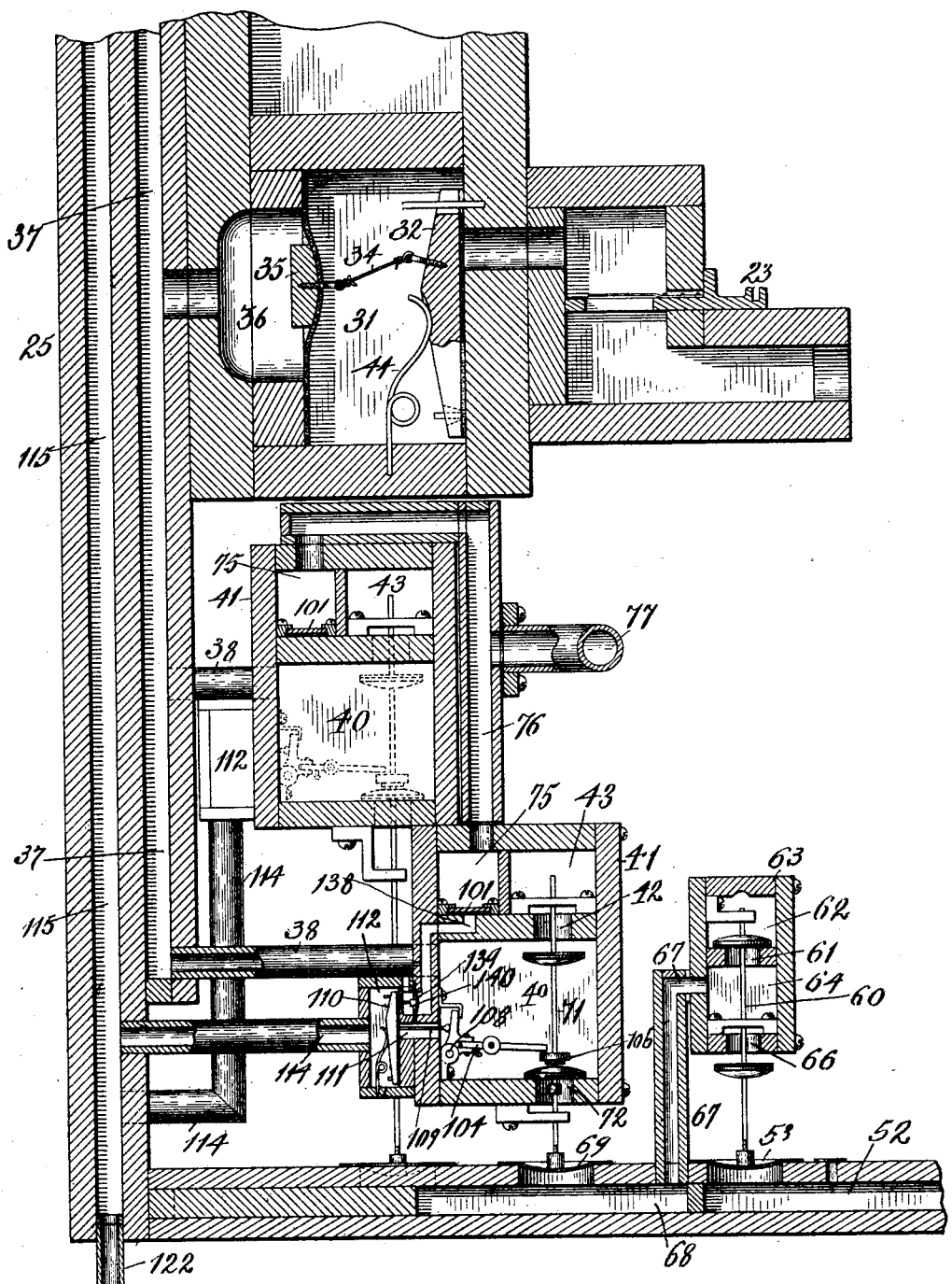
Figure 7:
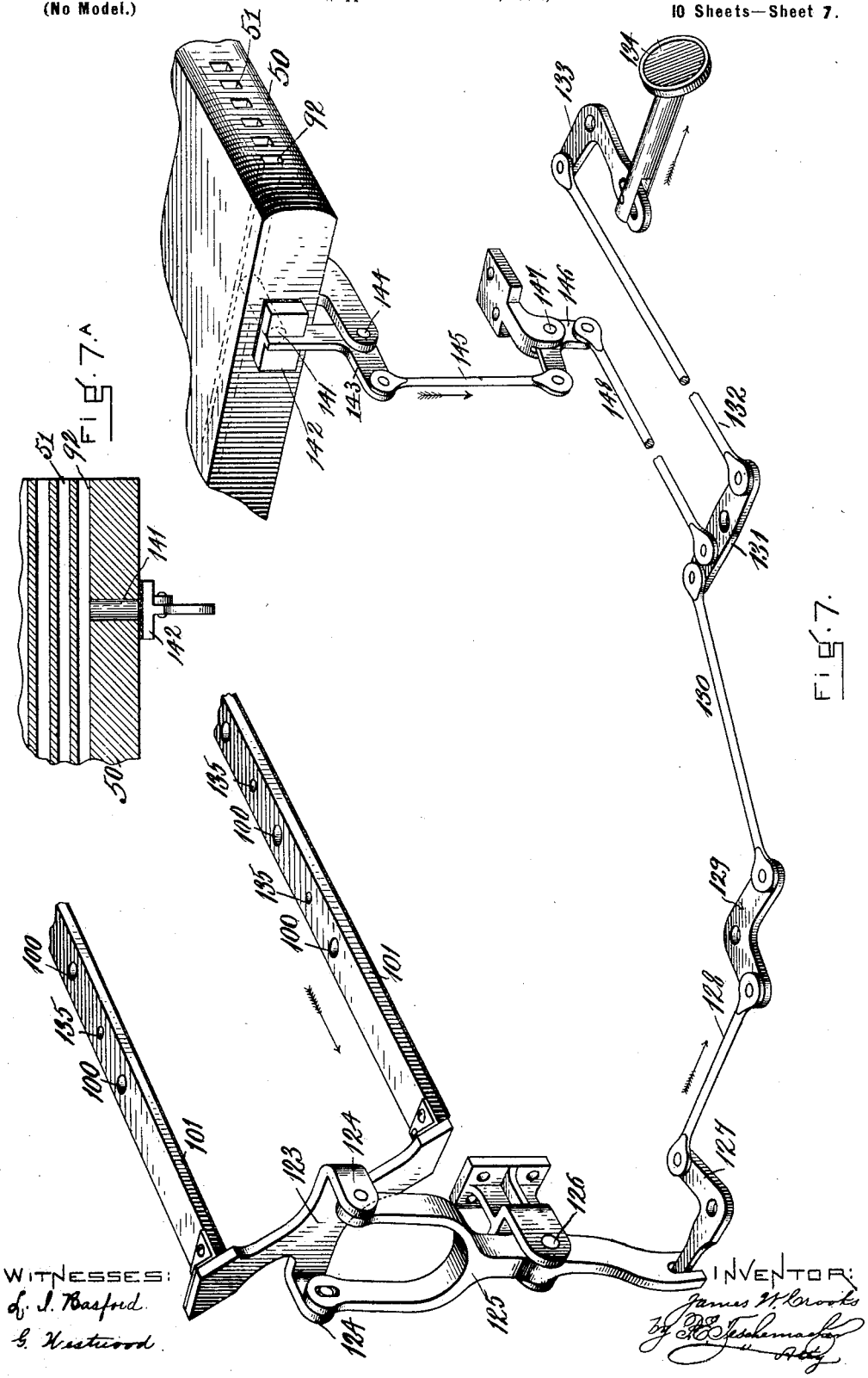
Figure 8:
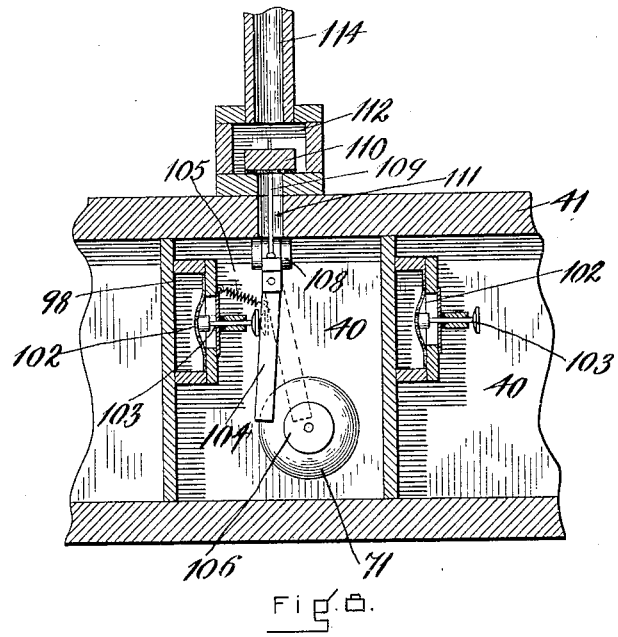
Figure 9:
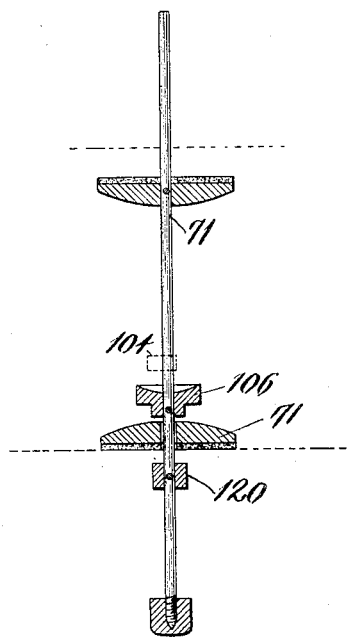
Figure 10:
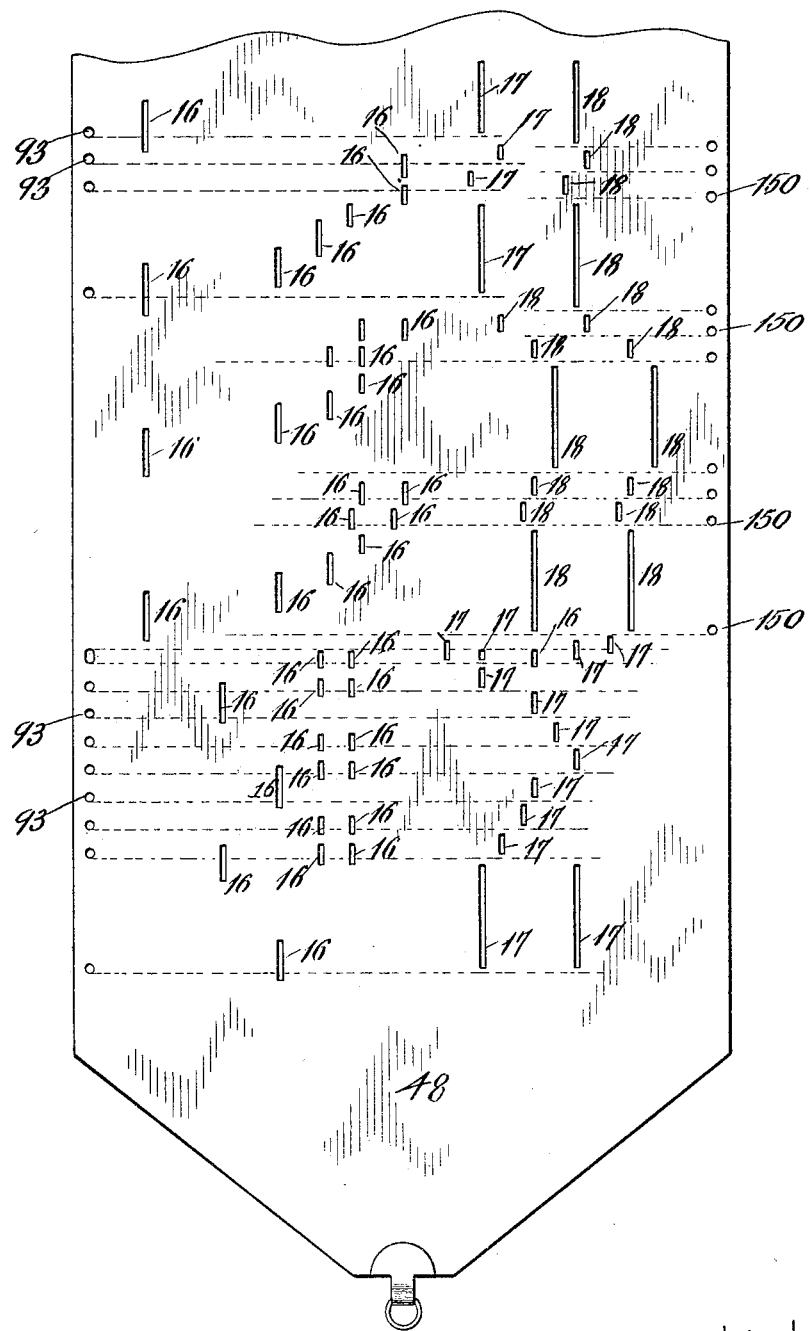

In the accompanying drawings, Figure 1 is a front elevation of a portion of a reed-organ embodying my improvements, portions of the casing and other parts being broken away to show the interior construction. Fig. 2 is a vertical section of the same on the line 2 2 of Fig. 4. Fig. 3 is a sectional elevation of the same on the line 3 3 of Fig. 1. Fig. 4 is a horizontal section on the line 4 4 of Fig. 2. Fig. 5 is an enlarged sectional detail on the line 5 5 of Fig. 3. Fig. 6 is a vertical section on the line 6 6 of Fig. 5. Fig. 7 is a perspective view of the pneumatic-coupling mechanism by means of which the notes of the first and second manuals or groups of sets of reeds or pipes are caused to be sounded together. Fig. 7$^A$ is a sectional detail of the tracker-board. Fig. 8 is an enlarged horizontal sectional detail on the line 8 8 of Fig. 5. Fig. 9 is a sectional elevation of one of the puppet-valves. Fig. 10 is a plan of a portion of the perforated music-sheet, showing the note and supplemental perforations arranged in accordance with my invention. Fig. 11 is a sectional perspective view illustrating the pneumatic mechanism connected with the supplemental duct of the tracker-board. Fig. 12 is a longitudinal section of the rear portion of the tracker-board.

In the said drawings, 25 represents the outer casing of the instrument, in the lower portion of which is placed the bellows 26, by means of which air is maintained under pressure in the wind-box 27, Fig. 2, and from which it passes through the opening 28, Fig. 3, into the wind-trunk 29, in which are arranged a series of stop-valves 30, which when opened allow the air under pressure to enter the long chambers or chests 31, Fig. 2, each containing the valves 32 of a set of reeds, said valves being each connected by a cord or wire 34 with a diaphragm-pneumatic 35, located in a cavity or recess 36, as shown in Fig. 6. The instrument here shown is provided with two independent groups of sets of reeds 23 and 24, corresponding to those of a two-manual organ, but has only a single keyboard, which is used only when it is not desired to operate the instrument by means of a perforated music-sheet. To enable the construction and mode of operation of this instrument to be more clearly understood, I shall in this description use the term "manual" to designate each separate group of sets of reeds. The recesses 36 of the pneumatics of the sets of reeds 23 of the first manual communicate with channels 37, connected by means of pipes or passages 38 with chambers 40 in two long chests 41 41, forming a portion of the pneumatic mechanism controlled by the music-sheet perforations, there being a chamber 40 for each note. Each chamber 40 contains air under pressure, which passes through a port 42 from a chamber 43, extending the whole length of the chest 41 and connected by a suitable passage 39, Fig. 3, with the wind-trunk 29, so that when the parts are in the position shown in Fig. 6 an equal air-pressure will be maintained on both sides of the reed-valve-operating diaphragm-pneumatic 35, causing the reed-valve to remain closed by means of its spring 44.

The two long chests 41, which are exactly alike, are placed one above the other, as shown in Fig. 6, to economize space, and the partitions of the upper and lower chests which form the chambers 40 are arranged alternately or staggering for convenience in arranging the pneumatics and the chambers or passages leading thereto from the tracker-board.

The stop-valves 30 of the several sets of reeds are operated in the usual manner by means of lever-and-rod connections with draw stops or pulls 46, as shown in Fig. 3, whereby the compressed air may be admitted to the valve-chambers 31 of the several sets of reeds, so that one set alone or any combination of sets of reeds may be used together in a well-known manner.

48, Figs. 2 and 10, denotes the perforated music-sheet, which is wound from one roll onto another in the usual manner and passes over the tracker-board 50, provided with the usual ducts or passages 51, communicating through pipes or passages 52 with the primary or controlling pneumatics 53, which control the valve-operating pneumatic mechanism by means of which the reed-valves of the first or principal manual or group of sets of reeds 23 are operated in accordance with the music-sheet perforations in a manner which I will now describe.

The several mechanisms by means of which the reed-valves of all the notes of the first manual are actuated being exactly alike, but one will be described.

The tracker-board 50, together with the music-sheet 48 and its carrying-rolls, is inclosed within an air-tight box or chamber 54, provided in front with a sliding glass door 55, which affords access to its interior when the music-sheet is to be changed, said box 54 being connected by a pipe 56, Figs. 3 and 4, with the wind-box 27, whereby it is supplied with air under pressure, which enters the ducts 51 of the tracker-board when exposed by the passage thereover of the perforations of the music-sheet. Each duct 51 is connected with a passage 52, Figs. 2 and 6, at the end of which is a primary diaphragm-pneumatic 53, which is raised when the air is admitted to the passage 52. This diaphragm lifts a primary puppet-valve 60, which opens a port 61, leading from a chamber 62 of a long chest 63 into a chamber 64, the chamber 62 being connected by a suitable passage 22, Fig. 3, with the wind-trunk 29, and said chamber 62 extending the entire length of the chest 63, which is divided by partitions into the chambers 64, one for each note, each chamber 64 communicating through a port 66 with the open air. When the puppet-valve 60 is raised by the diaphragm 53, the port 66 is closed and the port 61 opened, when the compressed air in the chamber 62 will enter the chamber 64 and thence pass by a pipe 67 into a passage or channel 68, containing a secondary diaphragm-pneumatic 69, which is then raised to lift the stem of a puppet-valve 71, placed within the chamber 40 of the long chest 41, when the upper disk of the valve 71 will close the port 42, and the lower disk of said valve will open a port 72, leading from the chamber 40 into the open air. This vents the cavity 36 through the channel 37, pipe 38, chamber 40, and port 72, when the pressure of the air in the chamber 31 will operate the pneumatic 35 and open the reed-valve 32 to sound the note, as required.

I will now describe the means by which any predetermined note or notes of any set or sets of reeds 24 of the second group or manual the stop or stops of which have been previously drawn on may be sounded in connection with or without the corresponding note or notes of the reeds 23 of the principal or first manual, thereby enabling me to produce solo effects hitherto impossible in organs operated by means of a perforated music-sheet as heretofore constructed.

Each of the chests 41 is provided above its chambers 40 with a chamber 75, extending its entire length and connected with a passage 76 common to both and connected by means of a pipe 77, Figs. 5, 6, and 11, with a chamber 78 in a small box 79, placed within the wind-trunk 29, said chamber 78 communicating through a port 15 (shown in Fig. 3 and dotted in Fig. 5) with the free or open air and by means of a port or passage 80 with the pipe 77. The port 80 opens into the wind-trunk 29 and is kept normally closed to the wind-trunk by the upper disk of a puppet-valve 81, the stem of which rests on a diaphragm-pneumatic 82 at the bottom of said chamber, a chamber or recess 83 beneath said pneumatic being connected by a pipe 84 with a passage 85, connected by a pipe 86 with a chamber 87 in the long chest 63, as shown in Fig. 11, the puppet-valve 88 of which is raised by a diaphragm-pneumatic 90, beneath which is a chamber or recess connected by a passage 91 with a supplemental duct 92 in the tracker-board 50, adapted to register with supplemental perforations 93, formed in the music-sheet 48, Fig. 10, said perforations being arranged in line with or preferably slightly in advance of the melody-note perforations of the music-sheet representing the notes which it is desired to sound in the supplemental manual either as solo notes or in connection with the corresponding notes of such set or sets of reeds of the principal manual as may have had their stops drawn on.

As soon as the air enters the supplemental duct 92 of the tracker-board it raises the diaphragm 90, which in turn raises the puppet-valve 88 and allows the compressed air in the chamber 62 of the chest 63 to pass by the port 95 into the chamber 87 and thence to the diaphragm-pneumatic 82, which is then raised to lift the valve 81, which closes the port 80 to the free-air chamber 78 and opens it to the wind-trunk 29, thus permitting the air from the latter to enter the pipe 77, from which it passes to the passage 76 and thence into the long chambers 75 of the two chests 41 41, which are thus filled with air under pressure whenever one of the supplemental perforations of the music-sheet is caused to register with the supplemental duct of the tracker-board.

On one side of each of the chambers 40 is a chamber 98, Figs. 5 and 8, which communicates through an aperture 99 at its top and an aperture 100 in a slide 101, to be hereinafter described, with the air-chamber 75 of the chest 41. Within the chamber 98 is a diaphragm-pneumatic 102, Figs. 5 and 8, which when operated by the air from the chamber 75 causes a sliding pin 103 to swing the pivoted arm of a bell-crank lever 104 against the resistance of a returning-spring 105 into the path of a collar 106 on the stem of the puppet-valve 71, which when raised, as previously described, swings the bell-crank on its pivot 108, Fig. 6, when its pivoted arm will act on a push-pin 109, which opens a spring-pressed valve 110, commanding a passage 111 from the chamber 40 to a chamber 112, which latter communicates through a pipe 114 with a channel 115, leading to the reed-valve-operating pneumatic 35 belonging to that particular note in each set of reeds 24 of the second or supplemental manual, and it will thus be obvious that whenever the valve 110 is opened by the means described the pneumatic-chambers 36, connected with the channel 115, will be vented through the pipe 114, chamber 112, passage 111, chamber 40, and port 72, when the corresponding reed-valve 32 of any set of reeds of the second or supplemental manual the stop of which has been previously drawn on will be opened to sound the note, as required. It will thus be understood that whenever the air is permitted to enter the supplemental duct 92 of the tracker-board by the passage thereover of one of the supplemental openings of the music-sheet the pivoted arms of all the bell-cranks 104 in the chambers 40 of the two chests 41 41 will be swung over the collars 106 of their respective puppet-valves 71, ready to act when said puppet-valves are raised, as before described.

The pivoted arm of the bell-crank 104 lies slightly above the level of the collar 106, as shown in Fig. 9, to prevent any liability of its catching against it when swung over by its pneumatic, and I therefore preferably make the lower disk of the puppet-valve 71 loose upon its stem, which is provided with a collar 120, which when the stem of the valve 71 is raised is brought into contact with the said lower disk to lift it at the same instant that the upper collar 106 is brought into contact with the arm of the bell-crank 104 to open the valve 110, thus causing said valve 110 and the port 72 to be opened at the same time as is necessary to insure the corresponding notes of the first and second manuals being sounded simultaneously.

Each second-manual channel 115 is connected by a pipe 122, Fig. 6, with a channel leading to one of the reed-valve-operating pneumatics of the pedal-base, (not shown,) the notes of which can thus be sounded in the same manner as those of the second manual previously described, provided the stop of the said pedal-base has been drawn.

When it is desired to couple the second or supplemental manual with the first manual in order that the notes of both may be sounded together in every instance, I employ a pneumatic-coupler consisting of two long slides 101 101, Figs. 6 and 7, which are fitted to slide in suitable ways at the bottoms of the chambers 75. These slides are connected at their outer ends by a plate 123, Fig. 7, having ears 124, to which is pivoted the forked end of a lever 125, fulcrumed at 126 and connected through the medium of a series of bell-cranks, rods, and levers 127, 128, 129, 130, 131, 132, and 133 with a pull knob or stop 134. Each slide 101 is provided with a series of holes 100, which when the pull-knob 134 is pushed in register with the holes 99, Fig. 5, leading to the passages 98 and pneumatics 102, which swing the arms of the bell-crank levers 104 over the collars 106. The slides 101 are also provided with a series of holes 135, alternating with the holes 100, and which when the knob 134 is drawn out to move the slides register with a series of passages 138, Figs. 5 and 6, leading to pneumatics 139, Fig. 6, one for each chamber 40 of the chests 41, the passages 98 being closed by the same movement of the slides which opens the passages 138. Each pneumatic 139 acts on a pin 140, which bears against and opens the valve 110 to vent the second-manual channel 115 as soon as the port 72 is opened by the rise of the puppet-valve 71. In order that the entire series of pneumatics 139 may be supplied with air at the moment that the pull-knob 134 is drawn out, an inlet-aperture 141 is provided at the end of the tracker-board, which connects with the supplemental opening 92, as shown in Fig. 7$^A$, said inlet-aperture 141 being normally covered by a valve 142 at the end of a bell-crank 143, fulcrumed at 144 and connected by a rod 145 with a bell-crank 146, fulcrumed at 147 and connected by a rod 148 with the lever 131, which is connected, as before described, with the pull-knob 134, so that when said knob is pulled to actuate the slides 101 air will be admitted continuously to the supplemental duct 92 to simultaneously supply air to all of the pneumatics 139, whereby all of the valves 110 will be instantly thrown open, so that whenever a puppet-valve 71 is raised to open the port 72 the corresponding note of the second manual will be sounded. It will be obvious that as the holes 99, leading to the pneumatics 102 for operating the swinging arms of the bell-cranks 104, are closed at the instant that the passages 138, leading to the pneumatics 139, are opened the swinging bell-crank arms will not be moved into the paths of the collars 106, but will remain at rest, the valves 110 having been opened by the pneumatics 139, the reason for opening the valves 110 by the pneumatics 139 instead of by the bell-cranks 104 being that if all the bell-crank arms should be swung simultaneously some of the puppet-valves 71 would probably be in raised positions, so that some of the bell-crank arms would be swung beneath their collars 106 instead of above the same, as is necessary, which would cause the disarrangement of the mechanism, and many of the notes would sound continuously.

If desired, the organ may be provided with an additional or third manual, in which case it would merely be necessary to provide said third manual with pneumatic mechanism precisely the same as that employed for the second manual, the swinging bell-cranks of the third-manual mechanism being placed within the chambers 40 and operated in the same manner as those 104, previously described. This third-manual mechanism would be connected with another supplemental duct or passage 154 in the tracker-board, preferably placed at its opposite end, and with which would register supplemental openings 150 at the right-hand edge of the music-sheet, as shown in Fig. 10. In this music-sheet the accompaniment-note perforations 16 are preferably arranged a little in advance of the melody-note perforations 17 for the second manual and the melody-note perforations 18 of the third manual, while the supplemental perforations are preferably arranged to register with the corresponding supplemental tracker-board duct an instant before the melody-note perforations reach their ducts in the tracker-board in order to insure the bell-crank arms 104 being thrown into the paths of the collars 106 before the puppet-valves 71 are raised, and by this arrangement of the perforations of the music-sheet the desired effects are produced in a most successful and harmonious manner. With an organ having three manuals a flute-stop of the second manual could be drawn to be sounded with a certain melody-note 17 of said second manual by means of one of the supplemental perforations 93 on the left-hand side of the music-sheet, and a horn-stop of the third manual could be drawn to be sounded with another melody-note 18 of said third manual by means of one of the supplemental perforations 150 on the right-hand side of the music-sheet, as clearly shown at the top of Fig. 10, where the dotted lines indicate the notes with which the supplemental perforations at the opposite edges of the music-sheet are employed.

The music would usually be cut with supplemental perforations on each side, as shown, to adapt it for use with a three-manual organ in order to save the expense of making special arrangements of the same piece of music for both two and three manual organs, and to avoid this and enable three-manual music to operate a two-manual organ I provide the tracker-board of a two-manual organ, such as is here illustrated, with a crossover pipe or passage 153, Figs. 2 and 12, extending lengthwise over the tracker-board and connecting the supplemental passage 92 with the other supplemental passage 154 on the opposite side of the tracker-board and adapted to register with the supplemental openings 150 of the music-sheet which are intended for use with a three-manual organ, and in this manner the supplemental openings 150 in the music-sheet can be made to act on the second manual in the same manner that they would on the third manual if used in a three-manual organ. In a three-manual organ, however, it will be obvious that the crossover-passage 153 would be dispensed with, as each set of supplemental openings in the music-sheet would coöperate with its own supplemental tracker-board duct.

The instrument is provided with the usual keyboard, the keys 155 of which are adapted to actuate valves 156, Fig. 2, by means of which the channels 37 are vented to cause the reeds of the first manual to be sounded in the ordinary well-known manner.

It will be obvious that by a proper arrangement of the pneumatic mechanism the organ can be operated under the exhaust system instead of by air-pressure, as previously described, and, if desired, the pneumatic mechanism may be operated under the exhaust system and the reeds or pipes by air-pressure.

What I claim as my invention, and desire to secure by Letters Patent, is—

1. In an organ having a plurality of manuals, or groups of sets of reeds or pipes and operated by means of a perforated music-sheet, the combination with a tracker-board having a series of main passages therein and a supplemental passage, and a perforated music-sheet provided with supplemental openings adapted to register with the supplemental passage of the tracker-board, of pneumatic mechanism connected with the main passages of the tracker-board for actuating the reed-valves of the first or principal manual, independent pneumatic mechanism for actuating the reed-valves of another or supplemental manual, and pneumatic mechanism connected with the supplemental passage in the tracker-board, whereby the pneumatic mechanism for actuating the reed-valves of the supplemental manual may be temporarily connected with the pneumatic mechanism which controls the reed-valves of the first manual so as to be operated thereby when a supplemental perforation of the music-sheet is caused to register with the supplemental passage in the tracker-board, substantially as described.

2. In an automatically-operated organ, the combination with a tracker-board having a series of main passages therein and a supplemental passage, and a music-sheet having supplemental openings therein adapted to register with said supplemental passage, of a plurality of manuals or groups of sets of reeds or pipes, pneumatic mechanism for controlling the reed-valves of the first or principal manual, pneumatic mechanism for controlling the reed-valves of any set or sets of reeds of a second or supplemental manual, the stop or stops of which have been previously drawn, and means connected with the supplemental passage of the tracker-board for temporarily connecting the pneumatic mechanism of the first manual with that of the second manual, whereby the sounding of the notes of said second manual may be controlled by the said supplemental openings in the music-sheet, substantially as described.

3. In an automatically-operated organ having a plurality of manuals, or groups of sets of reeds or pipes and operated by a perforated music-sheet, the combination of the tracker-board, a plurality of manuals or groups of sets of reeds or pipes, pneumatic mechanism connected with the main passages of the tracker-board and provided with puppet-valves, passages connecting the puppet-valve chambers with the reed-valve pneumatics of the first manual, passages connecting the said puppet-valve chambers with the reed-valve pneumatics of the supplemental manual, said passages being provided with valves, and pneumatic devices connected with a supplemental passage in the tracker-board by means of which the last-named valves are caused to be operated by the said puppet-valves to control the reed-valve pneumatics of the second or supplemental manual, substantially as set forth.

4. In an automatically-operated organ, the combination of a tracker-board, a plurality of manuals, or groups of sets of reeds or pipes and pneumatic-actuating mechanism communicating with the main ducts or passages of the tracker-board and provided with reciprocating puppet-valves, passages connecting the puppet-valve chambers with the reed-valve pneumatics of the first manual, passages connecting the puppet-valve chambers with the reed-valve pneumatics of the second manual, valves for controlling said passages, levers for operating said valves, said levers being provided with pivoted arms adapted to be moved into the path of the puppet-valves so as to be actuated thereby to open said valves, pneumatics for moving the pivoted arms of said levers into position to be operated by said puppet-valves, a passage communicating with the said pneumatics and with the wind-trunk and provided with a valve for normally closing the same, pneumatic devices for actuating the latter valve, said devices communicating with a supplemental passage in the tracker-board through which the mechanism is controlled in such manner that the valves which control the passages leading to the reed-valve pneumatics of the supplemental manual will be actuated when air is admitted to the supplemental passage of the tracker-board by the passage thereover of a supplemental opening in the music-sheet, substantially as described.

5. In an automatically-operated organ, the combination of the tracker-board, a plurality of manuals or groups of sets of reeds or pipes, pneumatic-actuating mechanism communicating with the main ducts or passages of the tracker-board and provided with puppet-valves, passages connecting the puppet-valve chambers with the reed-valve pneumatics of the first manual, passages connecting the puppet-valve chambers with the reed-valve pneumatics of the second manual and provided with valves, levers for operating said valves, said levers having pivoted arms, pneumatics for moving said arms, whereby they may be brought into the path of the puppet-valves so as to be actuated thereby to open said valves, passages communicating with said pneumatics and with a passage leading to the wind-trunk, a valve for normally closing said latter passage, a tracker-board provided with a supplemental duct or passage, pneumatic devices connected with said supplemental duct for opening the last-named valve when the notes of the supplemental manual are to be sounded, and a music-sheet having supplemental openings arranged to register with the said supplemental duct of the tracker-board, said supplemental openings being arranged in or nearly in a transverse line with the melody-note perforations, substantially as described.

6. In an organ having a plurality of manuals, or groups of sets of reeds or pipes and operated by means of a perforated music-sheet, the combination with the pneumatic mechanisms of the first and second manuals, lever mechanisms connected therewith, channels leading to the reed-valve pneumatics of the second manual, valves commanding said channels, and a tracker-board having a series of main passages therein connected with the pneumatic mechanism of the first manual, and having a supplemental duct or passage connected with the pneumatic mechanism for controlling the notes of the second manual, of a pneumatic-coupler provided with a coupler-stop and consisting of a slide provided with two series of holes alternating with each other and through which air may be supplied at different times to two separate series of pneumatics, one series for actuating the said lever mechanisms, whereby the puppet-valves of the first-manual pneumatic mechanism are caused to open the valves commanding the channels leading to the reed-valve pneumatics of the second manual, and the other series for actuating the said second-manual channel-valves when the first series of pneumatics are rendered inoperative by the movement of the coupler, and means connected with the coupler and operated therewith, whereby a continuous supply of air is admitted to the supplemental duct of the tracker-board to cause the said second-manual channel-valves to remain open while the coupler-stop is drawn, substantially as described.

7. In an automatically-operated organ, the combination with the tracker-board having a series of main passages therein and a supplemental passage, the latter provided with a branch inlet, and a coupling device for combining the notes of the first and second manuals or groups of sets of reeds, of a valve adapted to normally close the branch inlet of the supplemental passage of the tracker-board, and means for opening said valve to allow the air to pass continuously through said branch inlet to the supplemental passage of the tracker-board while the coupling device remains drawn on by its stop, substantially as described.

8. In an automatically-operated organ having a plurality of manuals, or groups of sets of reeds or pipes and pneumatic mechanism for sounding the notes of said manuals, the combination with a tracker-board having a series of main passages connected with pneumatic mechanism for sounding the notes of the first manual, and having a supplemental duct or passage connected with pneumatic mechanism for controlling the notes of the supplemental manual, of a music-sheet traversing said tracker-board and having the accompaniment-note perforations arranged with their front edges slightly in advance of the front edges of the melody-note perforations, and provided with a series of supplemental perforations adapted to register with the supplemental duct of the tracker-board, said supplemental perforations being arranged substantially in a transverse line with the melody-note perforations, substantially as described.

9. A music-sheet for self-playing reed or pipe organs, having openings therein for the notes of the first manual, openings therein for notes of second and third manuals, supplemental openings therein for controlling the playing of the notes of the second manual, and supplemental openings for controlling the playing of the notes of the third manual, the front edges of the openings for the notes of the second and third manuals lying in or nearly in a direct transverse line with the front edges of their respective supplemental openings and slightly to the rear of the front edges of the openings for the accompaniment-notes, the said supplemental openings being designed to communicate with a supplemental passage or passages in the tracker-board of the instrument through which the mechanism for sounding the notes of said second and third manuals is controlled, substantially as described.

10. In an organ of the character described, the combination with a tracker-board having a series of main passages therein leading to the note-controllers of the first manual and two separate supplemental openings independent of said note-controllers and with which are adapted to register two different series of supplemental openings in a music-sheet traversing said tracker-board, of a cross-over-passage connecting said two supplemental passages of the tracker-board with each other, whereby music-sheets adapted for a three-manual organ can be used to operate a two-manual organ; substantially as described.

Witness my hand this 25th day of January, A. D. 1901.

JAMES W. CROOKS.

In presence of—
  P. E. TESCHEMACHER,
  LILLIAN I. BASFORD.